United States Patent [19]

Madaj

[11] Patent Number: 5,324,446
[45] Date of Patent: Jun. 28, 1994

[54] METHOD OF STABILIZING BLENDS OF MELAMINE AND POLYOLS

[75] Inventor: Edmund J. Madaj, Imperial, Pa.
[73] Assignee: Miles Inc., Pittsburgh, Pa.
[21] Appl. No.: 759,251
[22] Filed: Sep. 13, 1991
[51] Int. Cl.$^5$ ................................................ C09K 3/00
[52] U.S. Cl. ................................ 252/183.11; 564/503; 252/183.12
[58] Field of Search ............ 252/186.1, 183.11, 183.12; 564/503

[56] References Cited

U.S. PATENT DOCUMENTS 4,293,657  10/1981  Nissen et al. .................... 521/121
4,546,121  10/1985  Haas et al. ...................... 521/164
4,644,015   2/1987  Scaccia et al. .................. 521/129

FOREIGN PATENT DOCUMENTS 371652  6/1990  European Pat. Off. .

*Primary Examiner*—Richard D. Lovering
*Assistant Examiner*—Valerie Fee
*Attorney, Agent, or Firm*—Joseph C. Gil; Godfried R. Akorli

[57] ABSTRACT

Disclosed herein are compositions comprising an effective combination of an amine terminated polyether and a urea compound, and melamine/polyol blends containing the same.

9 Claims, No Drawings

METHOD OF STABILIZING BLENDS OF MELAMINE AND POLYOLS

BACKGROUND OF THE INVENTION

The present invention relates to a method of stabilizing melamine/polyol blends. More specifically, the present invention relates to the stabilization of melamine/polyol blends wherein the melamine is employed as flame retardant in polyurethane foams prepared therewith.

In the use of these blends in preparing polyurethane foams, one of the problems encountered is lack of stability of the melamine/polyol blends. It has been found that melamine/polyol blends tend to sediment. As would be realized, the sedimentation adversely affects storage of compositions containing the blends and also affects the effective use of the compositions. To overcome the stability problems, various stabilizers have been employed with the melamine/polyol blends.

Some of the art-known stabilizers are amines such as diethanolamine, ethanolamine, trihexylamine or mixtures thereof disclosed in U.S. Pat. No. 4,644,015. The use of a combination of silicic acids and silicates, salts of perfluorinated alkylcarboxylic acids, alkylsulfonic acids and perfluorinated alkylsulfonic acids and polyperflouroether polyols and salts of fatty alcohol sulfates as stabilizers for melamine/polyol blends is disclosed in U.S. Pat. No. 4,293,657.

By the present invention there is provided a novel composition and a method of stabilizing melamine/polyol blends.

SUMMARY OF THE INVENTION

In accordance with the foregoing, the claimed invention encompasses a composition of matter comprising a stabilizing combination of an amine terminated polyether and a urea compound, and further encompasses a composition containing a melamine/polyol blend and an effective stabilizing combination of an amine terminated compound and urea compounds. The amine terminated compound is preferably prepared by reacting a polyfunctional acetoacetic acid ester with an amino compound containing at least two primary amino groups. By the term "effective stabilizing combination" herein is meant that the melamine blend is substantially non-sedimenting, i.e., it is readily dispersible and useful, in the preparation of polyurethane foam. Where there is settling, the melamine/polyol blend would readily disperse upon stirring.

The claimed invention further encompasses the method of stabilizing melamine/polyol blends by incorporating therewith the combination of an amine terminated compound and urea compound. Further encompassed by the claimed invention are polyurethane foams prepared with the stabilized melamine/polyol blends and the method of preparing the same.

DETAILED DESCRIPTION OF THE INVENTION

The amine terminated compounds that are useful herein can be prepared by reacting a polyfunctional acetoacetic acid ester with ammonia or an organic amino compound containing one or more primary amino groups. In the present embodiment of the invention the organic amino compound comprising aliphatic primary diamines are reacted with the polyfunctional acetoacetic acid esters. The resultant amine terminated compounds are useful in stabilizing melamine/polyol blends, particularly in the production of polyurethane foams.

The polyfunctional acetoacetic acid esters useful herein are produced by techniques generally known in the art. For example, the acetoacetic acid esters may be produced according to the processes described in U.S. Pat. Nos. 3,666,726 and 3,691,112, the disclosures of which are herein incorporated by reference. In general, the acetoacetic acid esters can be produced by reacting polyols with diketenes, or by transesterifying alkyl acetoacetates with polyols. The transesterification technique is the presently preferred technique. In general, the transesterification reaction is conducted at temperatures ranging from 100° to 210° C., preferably from 160° to 210° C. for periods of time ranging from 2 to 8 hours. If desired, transesterification catalysts, such as dibutyltin oxide and tetrabutyl titanate, can be used.

The polyols useful in producing the polyfunctional acetoacetic acid esters are of the type generally used in polyurethane chemistry. The polyols useful herein typically have molecular weights of from 62 to 12,000 and have hydroxyl functionalities of from 2 to 6. Examples of suitable polyols include the polyesters, polyethers, polythioethers, polyacetals, polybutadienes and polycarbonates containing 2 to 6 hydroxyl groups of the type known for the production of polyurethanes. The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols, triols and tetrols, 4,4'-dihydroxy diphenyl propane, sorbitol, aniline, ammonia, ethanolamine-and ethylene diamine.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety.

Suitable polythioethers, polyacetals, polycarbonates and other polyhydroxyl compounds are also disclosed in the above-identified U.S. patents. Finally, representatives of the many and varied polyols which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Polyols useful herein also include materials which are typically used as chain extenders in polyurethane chemistry. Examples of such materials include ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, and pentaerythritol.

The polyfunctional acetoacetic acid esters are preferably prepared by transesterifying any of the above noted polyols with lower alkyl acetoacetates. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the acetoacetic acid esters herein, transesterification catalysts may be necessary. In preparing the polyfunctional acetoacetic acid esters, it is generally preferred that the reactants be used in amounts such that one OH group is present for each acetoacetate group. However, it is also possible to use excess amounts of either reactant. In fact, in some cases it is preferred to use an excess of the acetoacetate to ensure complete reaction.

The polyfunctional acetoacetic acid ester is then reacted with either ammonia or a a compound containing one or more primary amino group, in the presence of an acidic catalyst. Preferably, the catalyst is selected from the group consisting of boron trifluoride etherate, trifluoroacetic acid, p-toluene sulfonic acid and organic acids having pKa values of from 0.1 to 0.8. It has been found that use of catalysts having pKa values outside the range noted leads to side reactions which lead to solid products. In addition, only the aforementioned catalysts lead to commercially acceptable yields. The amount of catalyst is generally selected so as to be sufficient to allow reasonable reaction times. In practice, the catalyst is added in amounts of from 0.05 to 2.0 mol %, and preferably from 0.3 to 1.0 mol %, based on the equivalents of acetoacetate present. This corresponds to from 0.01 to 0.2% by weight, and preferably from 0.05 to 0.1% by weight based on the weight of the polyfunctional acetoacetic acid ester.

In the process of the claimed invention, the polyfunctional acetoacetic acid ester is prepared by reacting a $C_1$ to $C_5$ alkyl acetoacetate with an organic compound containing from 2 to 6 hydroxyl groups and having a molecular weight of from 62 to about 12,000, in a ratio such that one mole of acetoacetate is used for each hydroxyl group.

The useful amines which are to be reacted with the polyfunctional acetoacetic acid esters are ammonia and aliphatic amines selected from the group consisting of ethylene diamine, propylene diamine, diethylene triamine, 2-methyl-1,5-pentanediamine and a mixture thereof.

The amount of amine is generally selected so that one mole of amine is available for every acetoacetate equivalent. It is of course possible to react less than one mole of amine with one equivalent of acetoacetate. This might result in a lower conversion if the reaction is terminated before all acetoacetate groups have reacted with amine groups, or in chain extension if all acetoacetate groups have reacted. On the other hand, in order to suppress chain extension and to obtain low viscosity products, it might be advantageous to use more than one mole amine per equivalent of acetoacetate. The unreacted amine can either be stripped off once the reaction is complete, or can remain in the product to serve as a chain extender, i.e., in a reaction with isocyanates.

The reaction is generally carried out at temperatures of from 40° to 200° C., preferably from 90° to 140° C., under excess pressure, reduced pressure, or, preferably, in the substantial absence of pressure. The process can be conducted continuously or discontinuously. In general, the acetoacetic acid ester, the amines, and the catalyst can be reacted and the water of reaction is collected. The reaction is considered complete when no more water comes off. The reaction time, of course, depends on the nature and the amounts of starting materials. In general, reaction times are between 1 and 6 hours. When the reaction is complete, the catalyst and any unreacted amine (if desired) are distilled off. The distillate can generally be recycled. U.S. patent application Ser. No. 07/524,268, filed May 5, 1990, which is incorporated herein by reference, relates to the amine-terminated compounds and the methods for preparing the same. The resultant amine terminated compound is employed in combination with urea compounds.

The useful urea compounds are those which are compatible with the melamine/polyol blends, in their use in the preparation of polyurethane foams. Illustrative but non-limiting examples of the urea compound can be alkyl- and acylureas. Specific but non-limiting examples can be mono-, di-, tri- and tetraalkyl-substituted ureas wherein each carbon atom in each alkyl group is attached to either nitrogen, oxygen or both. Illustratively, the useful urea compounds can be prepared by the reaction of urea with an aliphatic amine in which each carbon atom in each aliphatic group, i.e., alkyl group is attached to a nitrogen or oxygen atom or both. Examples of the aliphatic amine can be monoethanolamine, or diethanolamine. The preferred urea compounds can be N-2-hydroxyethylurea; N,N-bis-2-hydroxyethyl-urea and N,N,N',N'-tetrakis-2-hydroxyethylurea.

In the process for preparing polyurethane foams, the amine terminated compound and the urea compound can be added to the reaction stream containing melamine and polyol. The amine terminated compound is employed in an amount of 5 to 50% and preferably 10 to 20% based on the weight of the combination of polyol and amine-terminated compound.

The melamines are employed herein as flame-retardants. In accordance with the invention, any of the commercially available melamines such as "Aero-melamine" available from American Cyanamid can be employed herein. If desired superfine melamines such as those available from Melamine Chemicals Inc. can be used herein. Typically, the melamine can be employed in an amount of 30 to 100 parts and preferably 40 to 75 parts, based on 100 parts of the combination of polyols and amine terminated compound.

The useful polyols can be any of the art-known ones which are suitable for the preparation of polyurethane foams.

In the process for preparing the polyurethane foams, the polyol of the invention is reacted with a polyisocyanate, as follows. Foaming is carried out using normal foam formulations containing polyisocyanates, preferably tolylene diisocyanate containing 80% by weight 2,4-isomer and 20% by weight 2,6-isomer ("TDI 80").

The following materials are suitable starting components for the production of the polyurethane foams according to the process of this invention:

1. Polyisocyanates, including, for example, tolylene diisocyanate isomers, such as 2,4- and 2,6-tolylene diisocyanate and mixtures of these isomers ("TDI"); hexamethylene diisocyanate; and isophorone diisocyanate. Also suitable are carbodiimide-, urethane-, allophanate-, isocyanurate-, urea-, and biuret-modified polyisocyanates derived from 2,4- and 2,6-tolylene diisocyanate, hexamethylene diisocyanate, or isophorone diisocyanate. Polyphenylmethane polyisocyanates such as diphenyl methane diisocyanate (MDI) can be employed herein. Mixtures of the above polyisocyanates, including the various isomeric forms thereof, are, of course, also suitable.

Preferred polyisocyanates for use in accordance with the invention include tolylene diisocyanate in the form of an 80:20 mixture of the 2,4- and 2,6-isomers ("TDI 80"), tolylene diisocyanate in the form of a 65:35 mixture of the 2,4- and 2,6-isomers ("TDI 65"), and tolylene diisocyanate prepolymers.

2. The polyols of this invention which can have a molecular weight of from about 400 to about 10,000. Suitable compounds contain amino groups, thiol groups, or carboxyl groups, and preferably include compounds containing hydroxyl groups (especially 2 to 8 hydroxyl groups), particularly those having a molecular weight in the range from about 1000 to about 6000 (preferably in the range from 2000 to 6000). The suitable polyols can be used with other isocyanate reactive components.

3. Optionally, compounds containing at least two isocyanate-reactive hydrogen atoms and having a molecular weight of about 32 to about 399. Suitable compounds contain hydroxyl groups, amino groups, thiol groups, or carboxyl groups, preferably hydroxyl groups and/or amino groups, which serve as crosslinking agents or chain extending agents. These compounds generally contain about 2 to about 8 (preferably 2 to 4) isocyanate-reactive hydrogen atoms. Examples of such compounds can be found in German Offenlegungsschrift 2,832,253, pages 10 to 20.

4. Water as a chemical and physical blowing agent in a quantity of up to 15 parts by weight to 100 parts by weight of component (B).

5. Optionally, auxiliaries and additives, such as
   (a) readily volatile organic substances as further blowing agents,
   (b) known reaction accelerators and reaction retarders in the usual quantities,
   (c) surface-active additives, such as emulsifiers and foam stabilizers; known cell regulators, such as paraffins, fatty alcohols, and dimethyl polysiloxanes; pigments or dyes; known flameproofing agents, such as trichloroethyl phosphate and tricresyl phosphate; stabilizers against the effects of aging and weather; plasticizers; fungistatic and bacteriostatic agents; and fillers, such as barium sulfate, kieselguhr, carbon black, and whiting.

These optional auxiliaries and additives are described, for example, in German Offenlegungsschrift 2,732,292, pages 21 to 24. Further examples of surface-active additives and foam stabilizers, cell regulators, reaction retarders, stabilizers, flameproofing agents, plasticizers, dyes and fillers, fungistatic and bacteriostatic agents which may optionally be used in accordance with the invention and information on the use and mode of action of these additives can be found in Kunststoff-Handbuch, Vol. VII, published by Vieweg and Höchtlen, Carl-Hanser-Verlag, Munich, 1966, for example on pages 103 to 113.

The process according to the invention is carried out using the known one-shot process, the prepolymer process, or the semiprepolymer process, often using machines such as those described in U.S. Pat. No. 2,764,565. Information on processing machines which may also be used in accordance with the invention can be found in Kunststoff-Handbuch, Vol. VII, published by Vieweg and Höchtlen, Carl-Hanser-Verlag, Munich 1966, for example, on pages 121 to 205.

The foams produced in accordance with the invention can be used, for example, in the manufacture of seating. Such foams are also used, for example, as fillings in cushions and quilts.

The invention is further illustrated but is not intended to be limited by the following examples in which all parts and percentages are by weight unless otherwise specified.

EXAMPLES

General Method for Preparing Melamine/Polyol Suspension

Five hundred (500) grams of the polyol, or polyol-/ATPE (amine terminated polyether)/urea compound were mixed and the mixture was stirred with two hundred (200) grams melamine (the melamine used was "Aero-Melamine", a product of American Cyanamid Co.). The mixing was done with a compressed-air-driven mixer common in polyurethane processing and was continued long enough to give a uniform dispersion. Five hundred sixty-five (565) to five hundred seventy (570) grams of the resulting mixture was then poured into a five hundred (500) ml graduated cylinder. Within a few hours, air bubbles, whipped into the dispersion by the mixing process, usually surfaced. The loss of air's volume resulted in five hundred (500) ml of suspension.

Each suspension was allowed to stand for one week at room temperature. At the end of this time, up to three separated layers were present. The top layer was generally polyol (including ATPE) usually with some extremely fine melamine particles still in suspension. The middle layer was a suspension of melamine in polyol. This layer was sufficiently mobile to be poured as described below. The bottom layer, if present, consisted of mostly a sediment of melamine and a little polyol. If this bottom layer "flowed" at all, it did so as a series of clumps rather than as a uniform liquid.

The level of each layer was usually noted. However, it was not normally possible to visually distinguish suspension from sediment, nor was the liquid level always an adequate indicator of suspension quality, because sediment was sometimes absent even where considerable phasing had occurred. In such a case, the main objective of the invention, the avoidance of the dense sediment, was achieved, and the suspension was easily redispersed even though it had settled to some extent.

After noting the levels of each distinguishable layer, the cylinder was poured by propping at an angle of 20 degrees for ten minutes. The amount of material poured was measured at one, five, and ten minute intervals. After ten minutes the cylinder was elevated to a 45 degree angle for a further twenty minutes. The amount poured and the amount remaining in the cylinder was noted.

Table 1 shows the composition of each example. Table 2 gives the experimental results. It is readily seen that the urea compounds employed as suspension stabilizers improve the pourability of the suspensions. They also improve the ease of redispersion by avoiding densely packed sediments.

Compounds Used in Examples

Stabilizer A: N,N,N',N'-tetrakis(2-hydroxyethyl)urea
Stabilizer B: N,N-bis(2-hydroxyethyl)urea
Stabilizer C: N-(2-hydroxyethyl)urea
M3901: 6000 molecular weight polypropylene glycol modified ethylene glycol, available from Mobay Corporation.

TABLE 1

| Example | 1 | 2 | 3 | 4 | 5 | 6 | 7 | 8 | 9 |
|---|---|---|---|---|---|---|---|---|---|
| Ingredients: | | | | | | | | | |
| M3901 | 500 | 500 | 500 | 500 | 500 | 500 | 500 | 500 | 500 |
| Melamine | 200 | 200 | 200 | 200 | 200 | 200 | 200 | 200 | 200 |
| Stabilizer A | — | 3 | 6 | 12 | — | — | — | — | — |
| Stabilizer B | — | — | — | — | 3 | 6 | 12 | — | — |
| Stabilizer C | — | — | — | — | — | — | — | 3 | 6 |

TABLE 2

Results From the Use of the Compositions in Table 1

| Example | 1 | 2 | 3 | 4 | 5 | 6 | 7 | 8 | 9 |
|---|---|---|---|---|---|---|---|---|---|
| Liquid layer (ml) | 255 | 250 | 255 | 150 | 175 | 170 | 100 | 285 | 280 |
| Suspension and/or Sediment | 245 | 250 | 245 | 350 | 325 | 330 | 400 | 215 | 220 |
| Amount poured (grams) | | | | | | | | | |
| 1 min. | 350 | 397 | 335 | 405 | 404 | 338 | 498 | 352 | 345 |
| 5 min. | 363 | 484 | 396 | 470 | 505 | 448 | 533 | 448 | 468 |
| 10 min. | 368 | 500 | 405 | 482 | 523 | 466 | 538 | 475 | 490 |
| 30 min. | 422 | 534 | 456 | 526 | 546 | 522 | 547 | 528 | 529 |
| Amount remaining in cylinder (grams) | 151 | 35 | 115 | 39 | 24 | 48 | 18 | 42 | 41 |
| Percent poured | 74 | 94 | 80 | 93 | 96 | 92 | 97 | 93 | 93 |
| Sediment (after pouring) | yes | no | no | no | no | no | no | no | no |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition of matter comprising an effective stabilizing combination of an amine terminated polyether which is a reaction product of a polyfunctional acetoacetic acid ester and ammonia or an organic amino compound containing one or more primary amino groups, and a urea compound which is a member of the class of alkylhydroxyl ureas selected from the group consisting of N-2-hydroxyethyl urea, N,N-bis-2- and N,N,N',N'-tetrakis-2-hydroxyethylurea.

2. The composition of claim 1 wherein the amine terminated polyether is a reaction product of a polyfunctional acetoacetic acid ester and an aromatic polyamine.

3. The composition of claim 2 wherein the polyfunctional acetoacetic acid ester is derived from the reaction product of a $C_1$ to $C_5$ alkyl acetoacetate with an organic compound which is a polyol containing 2 to 6 hydroxyl groups and having a molecular weight of from about 62 to 12,000.

4. The composition of claim 2 wherein the aromatic polyamine is 2,4-toluenediamine.

5. The process of claim 1 wherein the urea compound is N,N,N',N'-tetrakis(hydroxylethyl)urea.

6. A process for stabilizing a composition containing a polyol and melamine, said process comprising incorporating into the composition a reaction product of an amine terminated polyether which is a reaction product of a polyfunctional acetoacetic acid ester and ammonia or an organic amino compound containing one or more primary amino groups, and a urea compound which is a member of the class of alkylhydroxyl ureas selected from the group consisting of N-2-hydroxyethyl urea, N,N-bis-2- and N,N,N',N'-tetrakis-2-hydroxyethylurea.

7. The process for stabilizing a composition as recited in claim 6, wherein the amine terminated polyether is a reaction product of a polyfunctional acetoacetic acid ester and an aromatic amine.

8. A stabilized composition containing a polyol, melamine and an effective stabilizing combination of a reaction product of an amine terminated polyether polyol which is a reaction product of a polyfunctional acetoacetic acid ester and ammonia or an organic amino compound containing one or more primary amino groups, and a urea compound which is a member of the class of alkylhydroxyl ureas selected from the group consisting of N-2-hydroxyethyl urea, N,N-bis-2- and N,N,N',N'-tetrakis-2-hydroxyethylurea.

9. The composition of claim 8 wherein the amine terminated polyether polyol is present in an amount of 10 to 20% and the urea compound is present in an amount of 0.5 to 3% based on the total weight of the composition.

* * * * *